United States Patent [19]
Cummings et al.

[11] Patent Number: 5,368,818
[45] Date of Patent: Nov. 29, 1994

[54] MONITORING AND CONTROL SYSTEM FOR SELECTIVE REGENERATION OF ALKANOLAMINE FROM CATION ION EXCHANGE RESIN WITH SODIUM HYDROXIDE

[75] Inventors: Arthur L. Cummings, Pompton Lakes, N.J.; Fred C. Veatch, Newkirk; Alfred E. Keller, Ponca City, both of Okla.

[73] Assignee: Conoco Inc., Ponca City, Okla.

[21] Appl. No.: 112,510

[22] Filed: Aug. 26, 1993

Related U.S. Application Data

[63] Continuation of Ser. No. 816,695, Jan. 2, 1992, abandoned.

[51] Int. Cl.$^5$ ............................................. G01N 27/10
[52] U.S. Cl. ...................................... 422/62; 204/422; 210/670; 210/679
[58] Field of Search ............................ 204/422; 422/62; 210/670, 679

[56] References Cited

U.S. PATENT DOCUMENTS

| | | |
|---|---|---|
| 2,628,191 | 2/1948 | Sard . |
| 3,246,759 | 4/1966 | Matalon . |
| 3,531,252 | 9/1970 | Rivers . |
| 4,076,618 | 2/1978 | Zeibilsky . |
| 4,199,323 | 4/1980 | Miller et al. . |
| 4,242,097 | 12/1980 | Rich, Jr. et al. . |
| 4,263,145 | 4/1981 | Wirth, Jr. . |
| 4,814,281 | 3/1989 | Byers . |
| 4,880,513 | 11/1989 | Davis et al. . |
| 4,970,344 | 11/1990 | Keller . |
| 5,006,258 | 4/1991 | Veatch et al. . |
| 5,045,291 | 9/1991 | Keller . |

Primary Examiner—Timothy M. McMahon

[57] ABSTRACT

A cation exchange resin is regenerated to remove alkanolamine and alkali metal cations from the resin by eluting the resin with alkali metal hydroxide to selectively displace alkanolamine from the resin, followed by elution of the resin with a mineral acid to displace alkali metal cations and any remaining alkanolamine from the resin. During this process, the resin is monitored by measuring and recording the conductance of the effluent from the resin and such recorded conductance is used to control the regenerant streams to provide more efficient regeneration of the resin.

19 Claims, 5 Drawing Sheets

MONITORING AND CONTROL SYSTEM FOR SELECTIVE REGENERATION OF ALKANOLAMINE FROM CATION ION EXCHANGE RESIN WITH SODIUM HYDROXIDE

This is a continuation application of U.S. Ser. No. 07/816,695 filed on Jan. 2, 1992, now abandoned.

BACKGROUND OF THE INVENTION

Alkanolamine sweetening units are used for the removal of $H_2S$ and $CO_2$ from natural gases, enhanced oil recovery gases, refinery hydrodesulfurizer recycle gases, FCCU and Coker gas plant tail gases, LPG streams, and Claus sulfur recovery tail gases. The alkanolamines commonly used are ethanolamine, diethanolamine, methyldiethanolamine, diisopropanolamine, and triethanolamine. These compounds are weak bases in water solution. When solutions of alkanolamines are contacted in packed, sieve plate, bubble cap or valve tray columns with streams containing $H_2S$ and $CO_2$, the $H_2S$ and $CO_2$ dissolve into the alkanolamine solution. The following chemical reactions then take place:

$$H_2S + Aamine = AamineH^+ + HS^-$$

$$H_2O + CO_2 + Aamine = AamineH^+ + HCO_3^-$$

General Eqn.: Acid Gases + Alkanolamine = Alkanolamine Salts of Acid Gases

The solution of water, unreacted alkanolamine, and alkanolamine salts are subjected to steam stripping to decompose the alkanolamine salts and remove $H_2S$ and $CO_2$ from the alkanolamine. The $H_2S$ and $CO_2$ removed from the alkanolamine can then be processed by Claus sulfur recovery, incineration, fertilizer manufacture, or other means.

$H_2S$ and $CO_2$ are not the only gases in the above referred to streams which form weak acids when dissolved in water. Other such acid gases, as they are commonly called, that may appear in gas streams treated with alkanolamine include $SO_2$, COS, or HCN. These gases also undergo the same reactions as $H_2S$ and $CO_2$ to form alkanolamine salts. These salts, though, cannot be removed by steam stripping as $H_2S$ and $CO_2$ salts are. Thus, they remain and accumulate in the system.

Another problem is presented if oxygen gets into the alkanolamine system. Oxidation of acid gas conjugate base anions leads to the formation of other alkanolamine salts most commonly salts of thiosulfate ($S_2O_3^{-2}$), sulfate ($SO_4^{-2}$), thiocyanate ($SCN^-$). Other inorganic acid anions such as chloride ($Cl^-$) may also be present. In addition to the inorganic acid anions, the alkanolamine solution may also be contaminated with organic anions such as anions of formic and acetic acid and the like. The alkanolamine salts of these inorganic and organic anions also cannot be removed by steam stripping.

Alkanolamine salts which cannot be removed by heat, called heat-stable salts, reduce the effectiveness of alkanolamine treating. The alkanolamine is protonated and cannot react with either $H_2S$ and $CO_2$ which dissolve into the solution. Also, accumulated alkanolamine salts are known to cause corrosion in carbon steel equipment which is normally used in amine systems. The salts are also known to cause foaming problems which further decrease treating capacity.

The normal procedure used to deprotonate the alkanolamine, so it can react with $H_2S$ and $CO_2$ is to add an alkali metal hydroxide such as NaOH to the amine solution. The deprotonated alkanolamine can then be returned to $H_2S$ and $CO_2$ removal service. However, the sodium salts of the anions of the heat-stable salts are also heat stable, are difficult to remove and thus accumulate in the alkanolamine solution, with attendant corrosion and foaming problems.

In one process, the alkanolamine solution containing heat-stable alkali metal salts is contacted with an anion exchange resin to remove the heat-stable anions from the solution and thereafter the solution is contacted with a cation exchange resin whereby alkali metal ions are removed from the solution. Anions of any heat-stable alkanolamine salts are also removed by the anion exchange resin. Removing the heat-stable salts in this manner reduces foaming losses, corrosion and maximizes the alkanolamine concentration.

The anion exchange resin used in the described process is regenerated by flushing with water to remove free alkanolamines, followed by elution with dilute sodium hydroxide to displace heat-stable salt anions with hydroxide ions and a second water wash to remove residual sodium hydroxide and sodium salts. The cation exchange resin is regenerated by flushing with water to remove free alkanolamine, followed by elution with dilute hydrochloric acid to displace sodium cations with hydrogen ions. A second water wash is then used to remove residual hydrogen chloride and sodium chlorides.

In the described process, alkanolamine in the alkanolamine solution is protonated by hydrogen at the ionic sites on the cation resin and becomes attached to these sites as alkanolamine cations. When the cation resin is regenerated with the dilute hydrochloric acid, both alkali metal cation and such alkanolamine are displaced from the resin with hydrogen ions taking their place. The alkanolamine in the regenerant stream cannot be returned to the alkanolamine circulating system for reuse because the alkali metal and chloride ions in the regenerant would recontaminate the system.

In one method of solving this problem, the cation exchange resin containing alkali metal cations and alkanolamine cations is regenerated by eluting the resin with a dilute alkali metal hydroxide solution to displace the alkanolamine from the resin with minimal displacement of alkali metal cations. Displaced alkanolamine cations react with hydroxide ions to free alkanolamine (plus water) which is reused in the alkanolamine treating process. Thereafter, the resin is eluted with a weak mineral acid to displace the metal cations and any remaining alkanolamine from the resin. Preferably the resin is washed with water before and after each of the elution steps.

In another process, the anion exchange resin previously mentioned is not used. The alkanolamine solution containing free alkanolamine, alkali metal salts of heat-stable acid anions and any remaining alkanolamine salts of such anions instead is brought in contact with a cation exchange resin. In the process, the hydrogen ions on the resin are displaced with alkali metal cations. In addition, free alkanolamine in the alkanolamine solution is protonated with hydrogen ions on the resin and becomes attached to the resin as alkanolamine cations. The anions that were counter ions for the alkali metal cations associate with the hydrogen released from the resin to form acids which are removed from the system in the liquid passing through the resin and in the water wash which follows the contact step. Thereafter, the procedure as previously described is followed, viz. elution of the cation resin with dilute alkali metal hydroxide, followed by weak mineral acid elution with appropriate water washes.

Alkanolamine losses and excessive consumption of regeneration chemicals result from the lack of reliable and convenient procedures for detecting critical break points in the regeneration of cation exchange resins used for the removal of cations from alkanolamines. It would be desirable to have a process for determining the critical break at various stages of the treating process to reduce costs associated with poor treating of amine streams. It would also be desirable to monitor and control alkanolamine reactivation processes in which cation resins are regenerated to separate cations from alkanolamines.

THE PRIOR ART

U.S. Pat. No. 2,628,191 to Sard discloses a method for determining when a cation exchanger has become exhausted which comprises measuring electrical conductivity of the effluent from the resin bed and comparing that measurement against the conductivity trace of a portion of effluent which is passed through a different quantity of exchange material, such as a small auxiliary ion exchanger for testing.

U. S. Pat. No. 3,246,759 to Matalon discloses means for measuring the conductivity of a solution downstream of a resin bed for controlling the regeneration of an ion exchange bed.

U.S. Pat. No. 3,531,252 to Rivers discloses a method of analyzing conductive solutions wherein the ionic constituent concentration of a sample is determined by: taking a first conductivity reading thereof; adding a reagent such that a substantial excess beyond the point of neutralization will not affect the conductivity of the solution and capable of reacting with said substituent in an amount of excess of that necessary for reaction; taking a second conductivity measurement; comparing the conductivities against a conductivity trace of known concentration of said constituent reaction with known quantities of reagent.

U.S. Pat. No. 4,199,323 to Miller et al provides an example of differential conductivity detection combined with ion exchange derivitization.

U. S. Pat. No. 4,242,097 to Rich et al discloses a system wherein a conductivity cell and its associated readout are provided for effluent detection of a solution which has been passed through an ion exchange column.

U. S. Pat. No. 4,814,281 to Byers discloses a monitoring system wherein conductivities of a solution are taken before and after passing a solution through an ion exchange column, and the differential conductivity is used to calculate sulfate concentration in accordance with a known relationship between a conductivity differential and sulfate concentration of a fluid sample.

U. S. Pat. No. 4,880,513 to Davis et al discloses a conductivity monitor which detects concentration of a circulation salt, while a second monitor detects concentrations of acid/base solutions which are utilized to regenerate exhausted ion exchange resins.

THE INVENTION

According to the process of the invention, cation exchange resin containing alkanolamine and alkali metal cations is regenerated by (a) eluting the resin with an alkali metal hydroxide solution whereby alkanolamine is selectively displaced from the resin.
(b) measuring and recording the conductance of the effluent from the resin,
(c) discontinuing elution with alkali metal hydroxide solution when the recorded conductance indicates displacement of the alkanolamine from the resin,
(d) thereafter eluting the resin with a mineral acid to displace the alkali metal cations and any remaining alkanolamine from the resin.
(e) discontinuing elution with mineral acid when the recorded conductance indicates the removal of alkali metal cations and any remaining alkanolamine from the resin.

DETAILED DESCRIPTION OF THE INVENTION

Each anion found in the amine solutions processed in accordance with the invention has a conductance which generally differs from the conductance of the other anions. The same holds true for cations such as $Na^+$. Equivalent conductances in aqueous solutions at 25° C. for the anions and cations of interest are set forth in the table.

TABLE

| ION | EQUIVALENT CONDUCTANCE SIEMENS |
|---|---|
| $Na^+$ | 50 |
| $Cl^-$ | 76 |
| $\frac{1}{2}SO_4^=$ | 80 |
| $HCOO^-$ | 54 |
| $CH_3COO^-$ | 41 |
| $SCN^-$ | 65 |
| $MDEAH^+$ | 30 |
| $OH^-$ | 199 |

The process of the invention may be used to monitor and control the regeneration of any cation resin which has been used to remove cations from alkanolamines. Such cation resins are used in the reactivation of alkanolamine solutions from treating processes. As previously pointed out, such alkanolamine solutions may result from processes in which hydrocarbon gases are contacted with an aqueous alkanolamine solution to absorb from said gases such impurities as $H_2S$ and $CO_2$. The resulting solutions which contain alkanolamine salts of $H_2S$ and $CO_2$ also may contain salts of various inorganic and organic anions which are present in the hydrocarbon gases or are formed in the solution by oxidation resulting from oxygen entering the alkanolamine treating system, such as those listed in the Table. The alkanolamine salts may be converted to alkali metal salts by introducing an alkali metal hydroxide to the alkanolamine solution. Any alkali metal hydroxide may be used for this purpose such as potassium hydroxide or lithium hydroxide; however, for economic reasons, sodium hydroxide is preferred. The alkali metal salts which are also resistant to heat or steam stripping are removed from the alkanolamine solution by contacting such solution with a cation exchange resin as in the processes previously described.

The process of this invention in which the alkali metal salts are removed to prevent buildup of these contaminants in the alkanolamine treating solution and alkanolamine is recovered in the regeneration of the cation exchange resin is best described by reference to the drawings.

Figure 1:
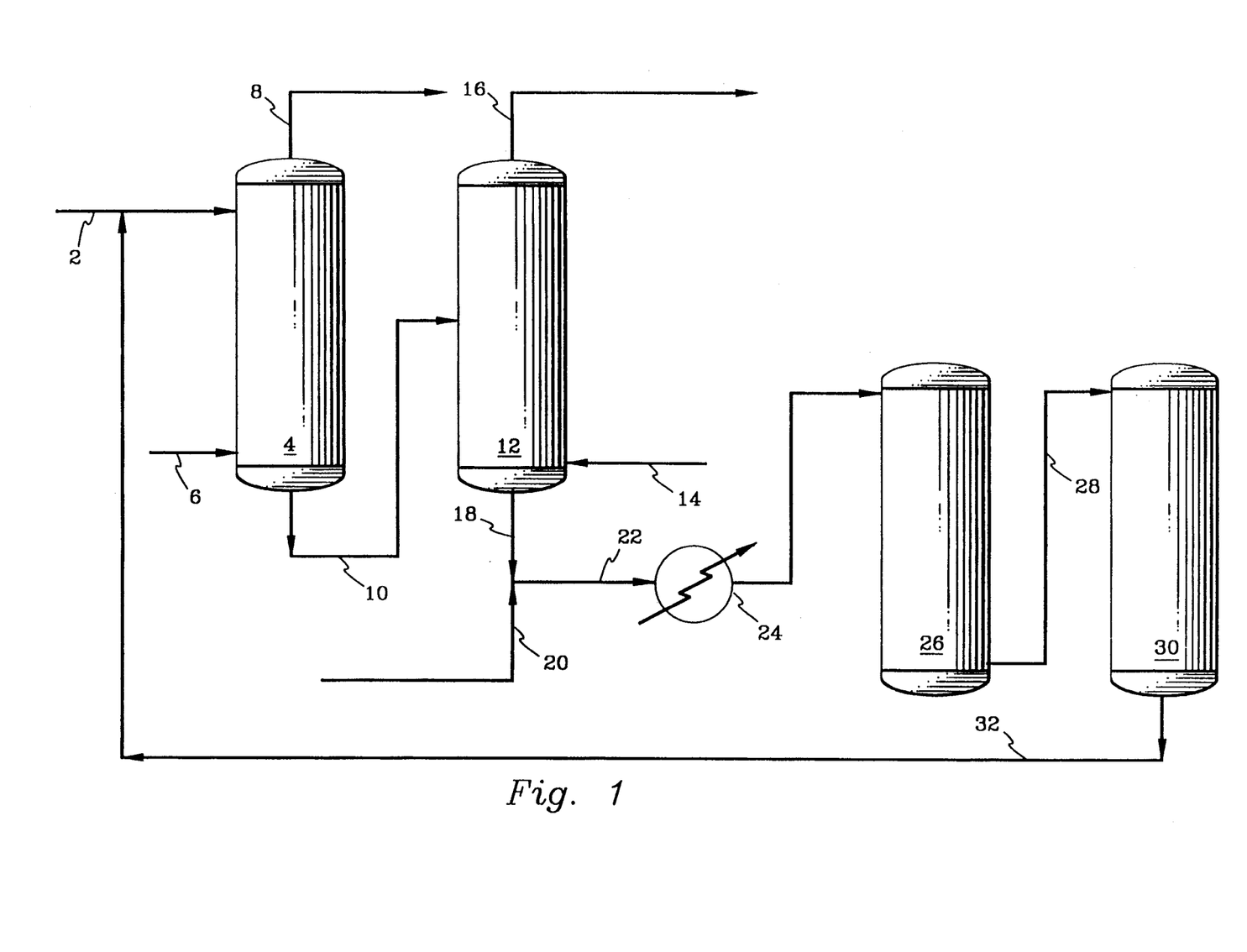
FIG. 1 is a schematic process flow diagram which illustrates an alkanolamine treating process in which alkanolamine solution is reactivated by passage sequentially through an anion and cation exchange resin.

Referring to FIG. 1, a gas containing undesirable hydrogen sulfide and carbon dioxide is introduced to a countercurrent treating zone 4 through line 6. The gas flows upwardly through treater 4 and contacts downflowing alkanolamine, in this instance, ethanolamine solution which is introduced to the top of the treater through line 2. The temperature in the treater is usually maintained in the range of between about 90 and about 130° F. while the pressure varies from between and 0 and about 1700 psig.

A product gas substantially free from hydrogen sulfide and carbon dioxide is withdrawn from the top of the treater via line 8. Ethanolamine solution containing absorbed hydrogen sulfide and carbon dioxide as salts of ethanolamine is removed from the treater through line 10 and introduced to regenerator 12. Steam introduced to the bottom of the regenerator through line 14 passes upward through the ethanolamine solution providing heat to decompose the hydrogen sulfide and carbon dioxide salts and strip them from the ethanolamine solution. A mixture of steam, hydrogen sulfide, and carbon dioxide is then removed overhead from the regenerator through line 16.

As pointed out previously, the feed gases introduced to the system in addition to hydrogen sulfide and carbon dioxide contain various acids and acid gases which react with the ethanolamine to form heat-stable ethanolamine salts. These salts being unaffected by the steam introduced to regenerator 12 pass along with the alkanolamine solution from the bottom of the regenerator through line 18.

An alkali metal hydroxide solution, in this instance, sodium hydroxide having a concentration in the range of about 5 weight percent to about 30 weight percent and preferably in the range from about 10 weight percent to 20 weight percent is combined with the ethanolamine solution through line 20. The sodium hydroxide reacts with the ethanolamine cation thereby releasing the ethanolamine and forming water and sodium salts of the heat-stable salt anions. The ethanolamine solution containing sodium salts and any unreacted amine salts passes through line 22 into a cooler 24 where the solution is reduced in temperature to between about 90° F. and about 105° F. to protect the ion exchange material contained in exchangers 26 and 30. After cooling, the mixture is introduced to anion exchanger 26 which contains a basic anionic exchange resin. In the anion exchanger, hydroxide ions attached to the cationic sites on the resin are displaced by the various anions contained in the sodium salts and in the alkanolamine salts. The ethanolamine solution then leaves the anion exchanger and passes to the cation exchanger through line 28. In the cation exchanger which contains an acidic cation resin, hydrogen ions at the anionic sites on the resin are displaced by sodium cations. In addition, free alkanolamine is protonated by hydrogen on the resin to form alkanolamine cations which also are retained at the anionic sites. The hydrogen ions then combine with the hydroxide ions already contained in the amine solution to form water. The ethanolamine solution is now free of sodium salts and, after stripping (not shown) to remove excess water, can be recycled to the gas treating system through line 32.

Sodium ions are removed from the ethanolamine solution to maintain the heat-stable salt anion removal capability in the anion exchanger. If sodium is allowed to remain in solution, hydroxide ions which are exchanged for other anions will also remain in solution. Hydroxide ions then will react with dissolved hydrogen sulfide or carbon dioxide to form bisulfide or bicarbonate ions which will be associated with the sodium ions in solution. These anions will then displace the hydroxide ions on the anion exchange resin and take up sites which are needed for nonregenerable salt anion removal. Replacing the sodium ions with hydrogen ions allows the hydrogen and hydroxide ions to react to form water.

Figure 2:
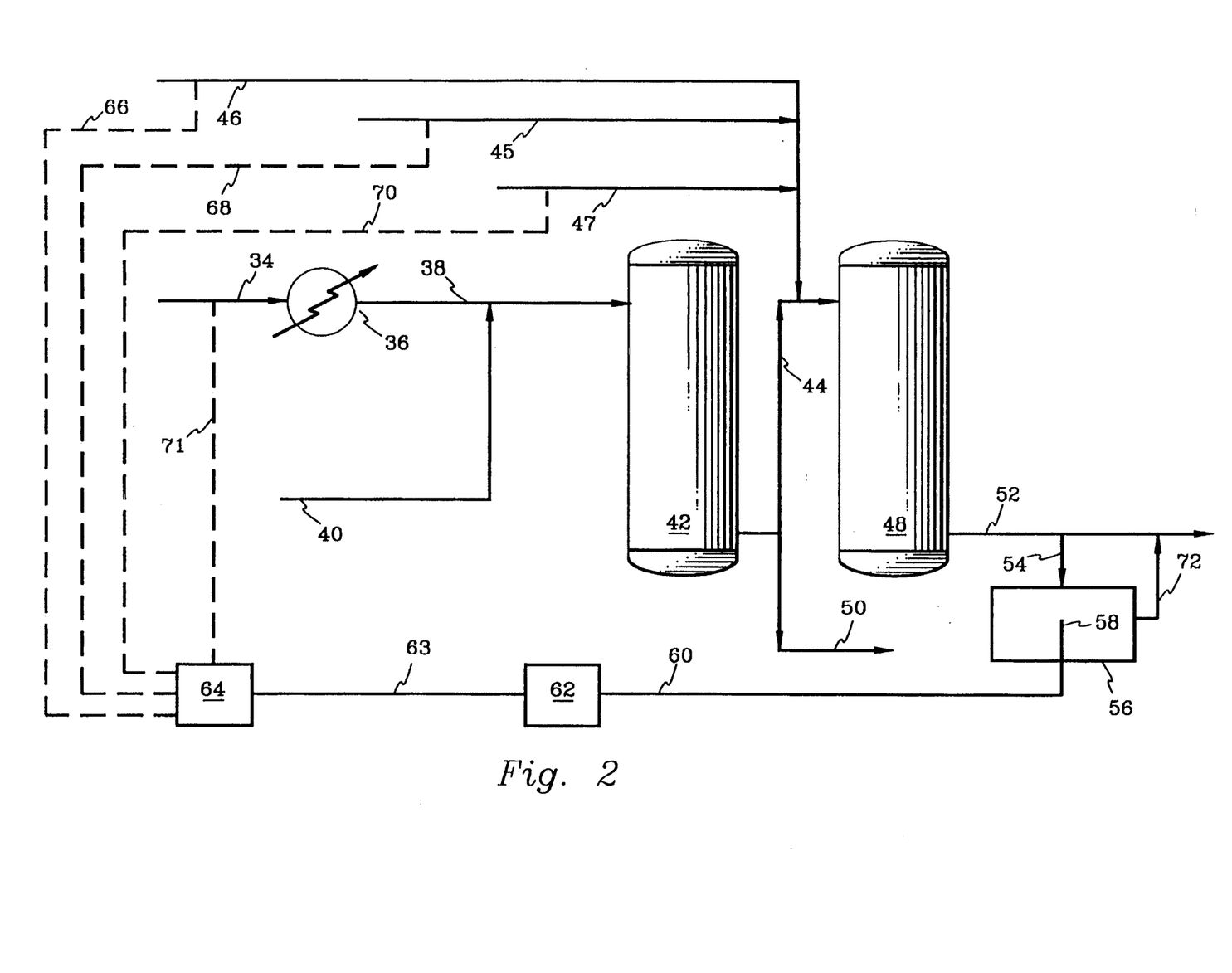
FIG. 2 is a schematic process flow diagram which illustrates regeneration of anion and cation exchangers with monitoring and control of the cation exchanger.

Periodically, exchange resins which have been used to remove alkali metal salts from spent aqueous alkanolamine solutions will require regeneration. A procedure for regenerating an anion and cation exchanger is illustrated in FIG. 2. To initiate this procedure, flow of ethanolamine solution to the exchangers is halted and water is introduced to the system through line 34. In order to protect the ion exchange materials, the water is cooled in cooler 36 and introduced through line 38 to anion exchanger 42. From there the water is passed to cation exchanger 48 and is removed from the unit through line 52. The purpose of the water is to flush the exchangers of all free ethanolamine. If desired, the water containing ethanolamine may be combined with the ethanolamine stream leaving regenerator 12 (FIG. 1). After the ethanolamine is flushed from the ion exchange resin beds, the two beds are switched from series flow to parallel flow. The anion exchanger is then eluted with a sodium hydroxide stream containing from about 10 to about 15 weight percent sodium hydroxide which is introduced to anion exchanger 42 through lines 40 and 38, and exits the exchanger via line 50. Introduction of the sodium hydroxide is continued until the heat stable salt anions in the anion exchanger have been replaced with hydroxide ions. The cation exchanger 48 is eluted with a dilute sodium hydroxide solution containing from about 1 to about 10 weight percent sodium hydroxide which is introduced to this exchanger through line 46 and exits through line 52. The dilute sodium hydroxide solution preferentially displaces the ethanolamine from the cation exchanger, leaving sodium cations in place of the ethanolamine cations. The displaced ethanolamine cations react with hydroxide ions to free alkanolamine (plus water) which is introduced to the ethanolamine system where it is reused in the alkanolamine treating process.

After the treatment with the dilute sodium hydroxide solution to remove the ethanolamine from the resin cation exchanger 48 is washed with water introduced through line 45 and removed therefrom through line 52 to remove residual sodium hydroxide. Cation exchanger 48 is then eluted with a dilute sulfuric acid solution containing from about 1 to about 25 weight percent hydrogen sulfate which is introduced to this exchanger through line 47 and exits therefrom through line 52. The exiting solution contains sodium cations and a small amount of alkanolamine. Flow of the sulfuric acid solution is continued until the sodium cations in the ion exchange resin have been replaced with hydrogen ions. Except as noted, the streams exiting the exchangers through lines 50 and 52 are normally sent to waste water treating. After elution the two beds are washed with water to remove any residual materials after which they are returned to service.

Part of the alkanolamine solution leaving the bottom of cation exchanger 48 is passed through line 54 into container 56 which contains a conductance probe 58. At least part of the alkanolamine solution entering container 56 contacts conductance probe 58. Alkanolamine solution exits container 56 through line 72 and is recombined with effluent from exchanger 48. While the drawing shows only a portion of the alkanolamine solution passing through the conductance probe, if desired the conductance probe may be placed in line 52, thus eliminating the need for lines 54 and 72. The conductance probe is connected through 60 to a conductance meter 62 which, in turn, is connected through 63 to a conductance recorder 64, the output of which is a conductance trace.

The use of dilute sodium hydroxide solution to preferentially displace alkanolamine from the cation exchange resin makes it possible to eliminate the anion exchange resin from the alkanolamine treating process. The cation exchange resin then becomes the only resin used in the process. Use of a cation exchange resin as the sole resin in the process is illustrated in FIG. 3.

Figure 3:
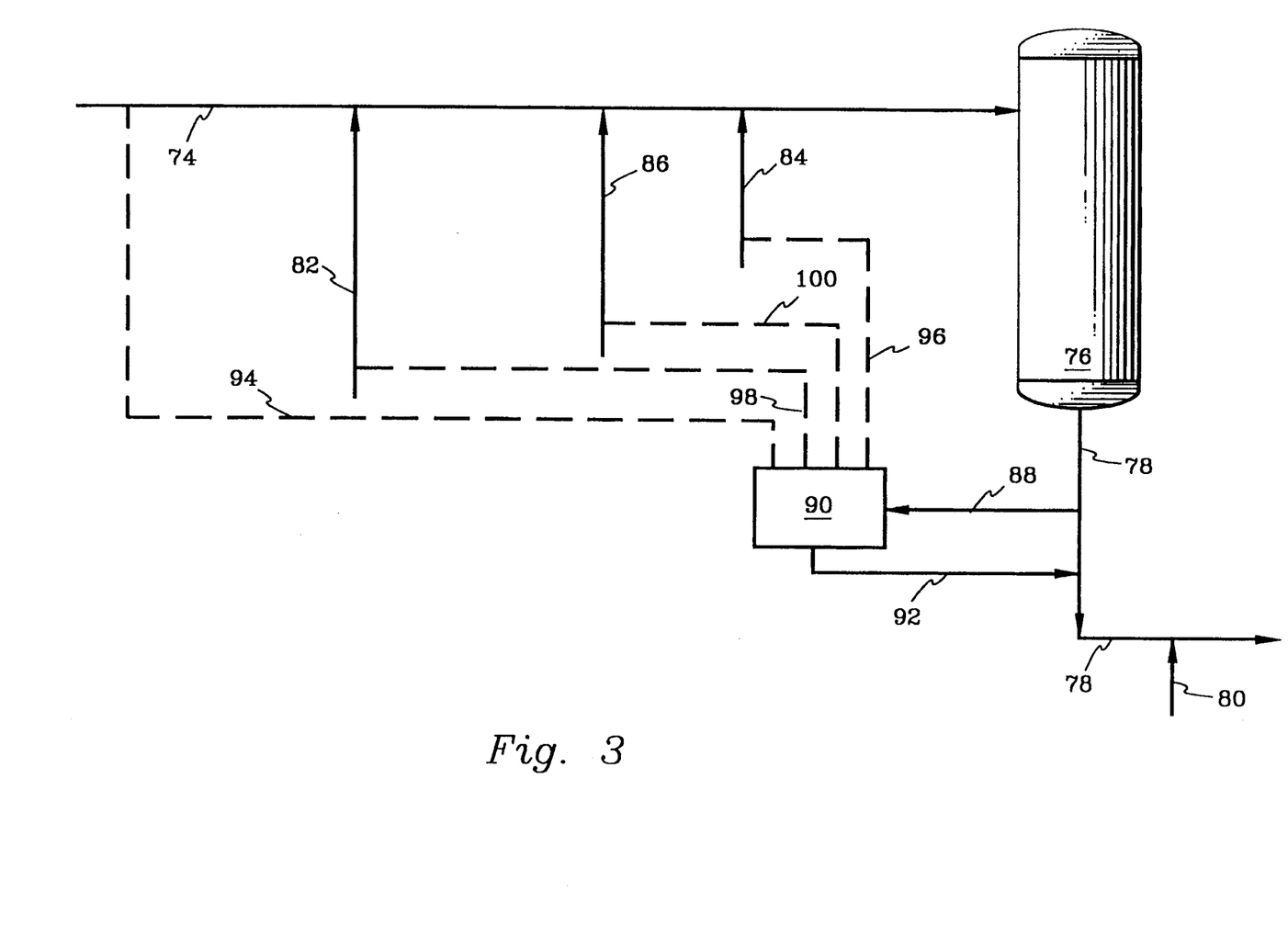
FIG. 3 is a schematic process flow diagram which illustrates regeneration of a cation exchanger with monitoring and control of the exchanger.

Referring to FIG. 3, spent ethanolamine solution containing heat stable sodium salts, ethanolamine salts and free ethanolamine is introduced to cation exchanger 76 through line 74. As the solution passes through the exchanger, the ethanolamine and sodium cations become attached to the negative charge sites on the exchange resin displacing hydrogen from the sites. In addition, free ethanolamine in the solution is protonated by hydrogen on the negative charge sites and is attached to the resin in ethanolamine cation. The acids which result from the reaction of displaced hydrogen with the heat-stable salt anions, and water exit the cation exchanger through line 78, are neutralized with caustic introduced through line 80, and are disposed of to a waste treatment system (not shown).

When ethanolamine breaks through the outlet of cation exchanger 76, the flow of ethanolamine solution is stopped and dilute sodium hydroxide solution is introduced to the cation exchanger through line 82. As the dilute sodium hydroxide solution passes through the exchanger, it displaces the ethanolamine from the cation resin leaving sodium cations behind. The displaced ethanolamine is removed from the cation exchanger through line 78 and reused in the treating process.

After all of the ethanolamine has been removed from the cation resin, exchanger 76 is washed with water introduced through line 86 to remove any residual sodium hydroxide. The wash water plus residual materials is discharged through line 78. The cation exchanger 76 is then contacted with dilute sulfuric acid or other dilute mineral acid introduced to the exchanger through line 84. The hydrogen ions in the sulfuric acid displace the sodium cations attached to the negative charge sites of the resin. Effluent from the exchanger containing sulfate salts of sodium exits through line 78 for waste disposal.

After all of the sodium has been removed from the resin, the resin is water washed again, with water introduced through line 86, to remove residual sulfuric acid and sulfate salts. This wash stream is removed from the exchanger through line 78 for waste disposal. At this point, the regeneration is complete and the cation exchanger is available for treatment of additional ethanolamine solution containing heat-stable salts.

Effluent from exchanger 76 is passed through line 88 into 90 which comprises a conductance probe, a conductance meter, and a conductance trace recorder similar to those previously described in the discussion of the effluent from exchanger 48. Here again if desired, only a portion of the effluent from exchanger 76 may be passed into 90 with the remainder being withdrawn from the unit through line 78. The effluent leaving 90 exits through line 92 and is combined with effluent from exchanger 76 in line 78.

Figure 4:
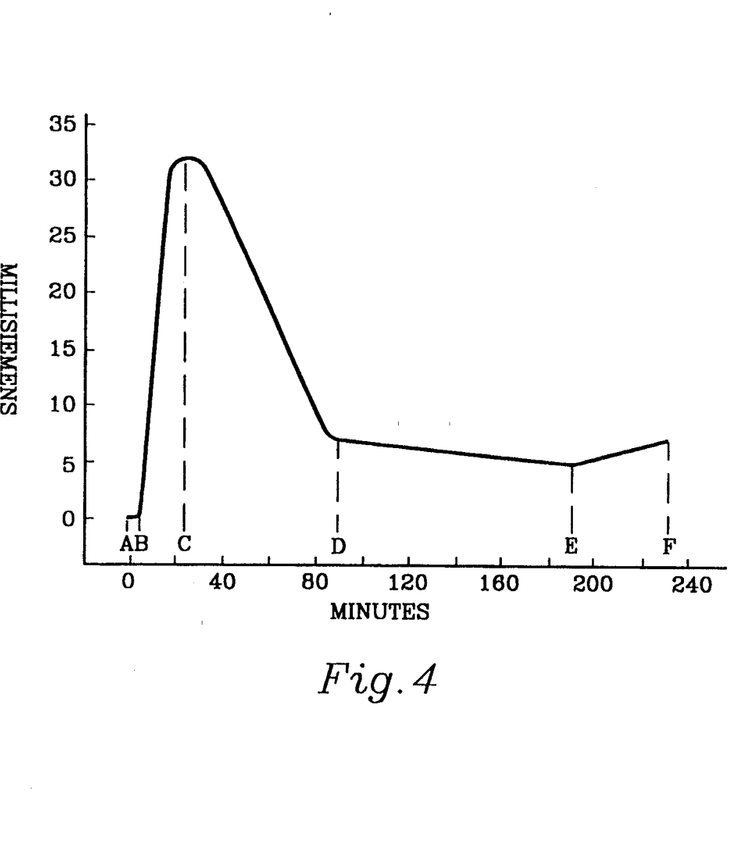
FIG. 4 shows conductance traces (conductance plotted versus time) of an alkanolamine solution containing sodium ions and anions being passed through a cation exchange resin until exhaustion of the resin.

A trace for the alkanolamine solution passing through exchanger 76 during exhaustion of the cation exchange resin is shown in the plot of FIG. 4. The trace was obtained by passing 530 grams of MDEA (Methyldiethanolamine) in gravity flow through 170 grams of IRC-50 cation exchange resin in the acid form. The flow rate of MDEA through the resin varied during the process because of the change in viscosity of the material in the cation exchange resin at various stages of the process.

During exhaustion, sodium ions from the alkanolamine (MDEA) solution exchange with hydrogen ions on the resin. The hydrogen ions protonate alkanolamine in the solution:

In the equation, $A^-$ symbolizes all anions, aamine represents alkanolamine, and $Na^+$ is sodium ion. Alkanolamine molecules also attach to the resin because of their affinity for protons:

In FIG. 4 the conductance of the alkanolamine (MDEA) solution is plotted with time to provide a picture of what is taking place within exchanger 76.

The effluent from exchanger 76 is initially water from the pre-rinsed column of resin and has a very low conductance (time A to B). The conductance rises (B to C) as partially protonated anions elute with water from the amine solution. Maximum conductance (c) is reached when sodium ions and alkanolamine have saturated the column capacity and protonated and neutral amine begin to join the eluate. Additional sodium entering the column replaces alkanolamine on the resin, increasing the protonated amine concentration in the eluate while the free amine concentration is increasing and decreasing the conductance until eluate concentrations stabilize (time D). Finally, when sodium breaks through to the eluate, a slight rise in conductance (time E to F) occurs as the concentration of protonated amine decreases and the sodium ion concentration increases. Terminating the exhaustion before or soon after sodium breakthrough leaves the resin holding sodium ions and alkanolamine.

Figure 5:
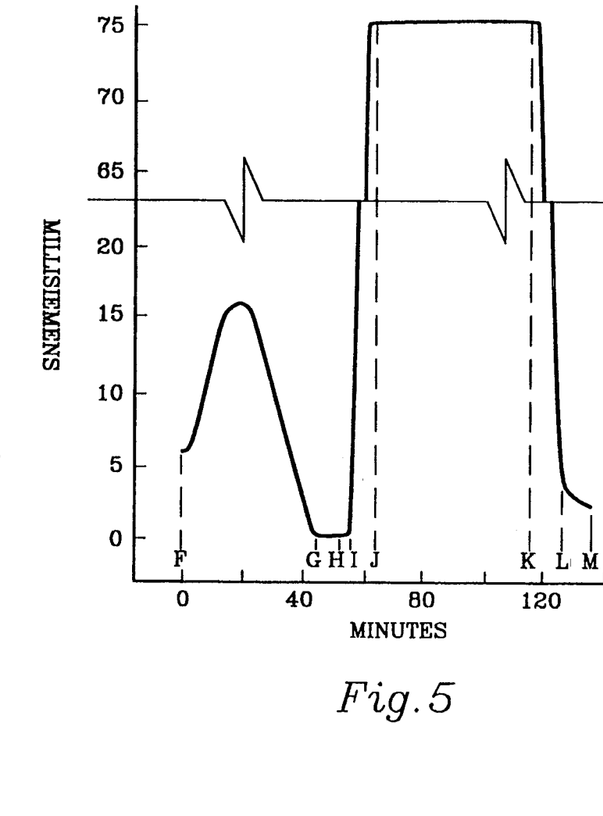
FIG. 5 shows conductance traces (conductance plotted versus time) of a continuation of FIG. 4 through removal of amine from the cation exchange resin.

As previously described, regeneration of cation exchanger 48 proceeds in two phases. The first phase selectively removes alkanolamine from the resin by introducing a weak solution of sodium hydroxide (NaOH):

The second phase regenerates the cation resin to the hydrogen form by use of mineral acid, such as sulfuric acid:

FIG. 5 is an example of the conductance trace during phase 1, the removal of amine. This trace was obtained by water washing the IRC-50 resin of FIG. 4 with 300 grams of water at a rate of 16.7 grams per minute. This was followed by elution of the resin with 803 grams of 2% sodium hydroxide at a rate of 5.9 grams per minute which was in turn followed by a second water wash of 250 grams at a rate of 14.7 grams per minute.

The trace begins where FIG. 4 ended, at time F. The operational steps of phase 1 are water rinse, NaOH charge, and water rinse. As water rinses the resin and begins to enter the eluate, conductance first rises, then falls with decreasing ionic content to the conductance of the rinse water (time G). Addition of NaOH solution soon bring free amine into the eluate and conductance rises slightly (time H). The eluate between time H and I is an aqueous amine solution, free of heat-stable salts and sodium. When nearly all amine has left the resin, NaOH enters the eluate (time I) and conductance rises sharply. By time J the eluate is the same as the entering NaOH solution. Conductance does not change until the water from the next rinse elutes (time K) and conductance drops sharply to the rinse water conductance (L to M).

It should be noted that the length of time between H and I depends on the amine loading on the resin. The magnitude of the NaOH conductance (J to K) depends on the concentration of NaOH in the regenerant solution. The end of the first phase of regeneration (time M) could be earlier, at a higher conductance between K and L, since the eluate is simply aqueous NaOH.

Figure 6:
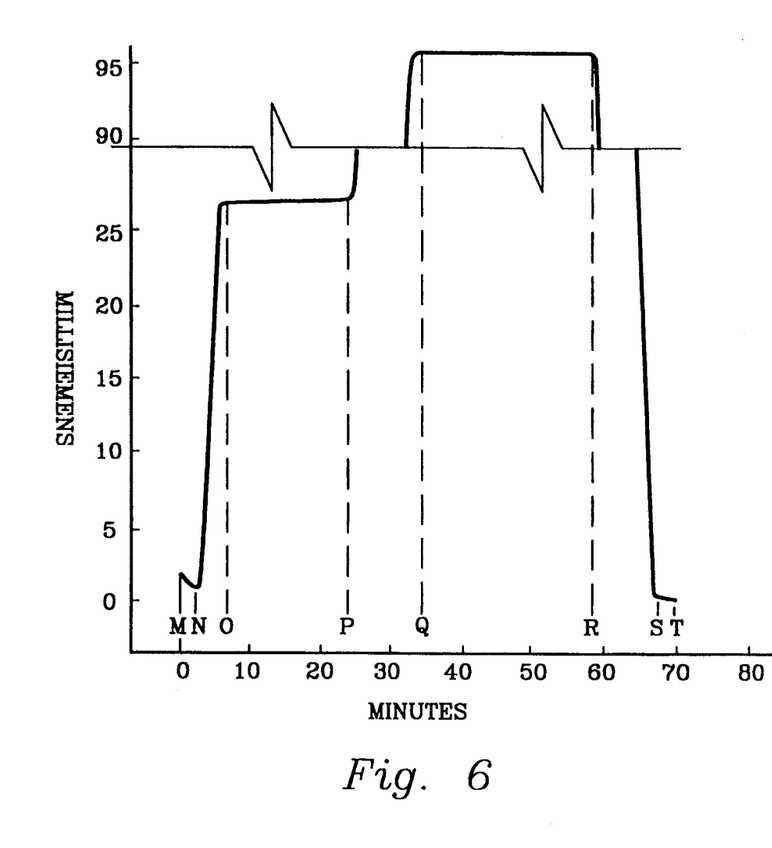
FIG. 6 shows conductance traces (conductance plotted versus time) of a continuation of FIG. 5 through conversion of the cation exchange resin from sodium to hydrogen form.

FIG. 6 is an example of the conductance trace during the second phase of regeneration, conversion of the resin from Na to H form. This trace was obtained by elution of the IRC-50 resin of FIG. 5 with 1550 grams of 3% $H_2SO_4$ at a rate of 22.1 grams per minute followed by a water wash with 317 grams of water at a rate of 35.2 grams per minute.

The trace begins where FIG. 5 ended, at time M. The operational steps of phase 2 are $H_2SO_4$ charge and water rinse. Conductance is flat or decreases from M to N as water from the preceding rinse is displaced from the resin. From N to 0 conductance rises as $Na_2SO_4$ concentration increases in the eluate. Conductance from O to P reflects the constant concentration of $Na_2SO_4$ as incoming sulfuric acid is converted to sodium sulfate by exchange with the resin. As the resin becomes depleted of sodium, the exchange rate slows and conductance rises (time P) as hydrogen concentration increases in the eluate. From Q to R the eluate is the same as in incoming sulfuric acid solution. Conductance drops from R to S as rinse water dilutes and clears the ionic content of the eluate. Finally, the conductance matches that of the incoming rinse water (S to T).

It should be noted that the magnitude of the $Na_2SO_4$ conductance (0 to P) and the sulfuric acid conductance (Q to R) depend upon the concentration of sulfuric acid in the regenerant solution. The maximum practical $H_2SO_4$ concentration may be limited by the particular conductance measuring equipment used. In lab tests, 15 percent sulfuric acid was too concentrated for that reason; 3 percent was much better for monitoring (and required less total sulfuric acid.)

With the arrangements shown in FIG. 3, it is possible to continuously monitor the electrical conductance of the effluent from cation exchanger 76. The direction and magnitude of the conductance changes may be interpreted to determine when to stop introduction of regenerant streams to the resin in order to selectively remove alkanolamine from the cation resin containing both alkanolamine and sodium cations and regenerate the resin to the hydrogen form from the sodium form.

It is also possible to automatically control the flow of the various streams introduced to exchanger 76 during the regeneration phases. Thus, the flow of water through line 86 may be started and/or terminated by a signal transmitted from trace recorder 90 through 100 to line 86 at the appropriate times during the regeneration cycle. Similarly, the flow of dilute sodium hydroxide solution, and sulfuric acid to exchanger 76 may be controlled by signals transmitted from trace recorder 90 through 98, and 96, respectively.

With the arrangement shown in FIG. 2, monitoring of the electrical conductance of the effluent from cation exchanger 48 is readily carried out by the use of traces obtained from the conductance trace recorder. These traces may be used to determine when the flow of regenerant streams to the exchanger should be changed. Signals transmitted from the recorder may also be used to control the flow of these streams through 66, 68 and 70 in the same manner as disclosed in the regeneration of exchanger 76.

The quantities of the various regenerant streams, i.e. alkali metal hydroxide, mineral acid, and water employed in carrying out the process will depend on the amount of ion exchange resin used and the composition of the alkanolamine solution being reactivated. The amounts of alkali metal hydroxide and mineral acid used will also vary depending on the concentrations of these materials. The quantities and the flow rates employed are readily determined for each operation within the skill of the art.

The invention has been specifically described in its application to the use of ethanolamine, however, any of the other common alkanolamines previously mentioned may be used in the process. The alkali metal hydroxide used to convert the alkanolamine heat-stable salts to alkali metal salts is preferably sodium hydroxide, however, other alkali metal hydroxides such as potassium hydroxide or lithium hydroxide may also be employed. The dilute alkali metal hydroxide solution used in the process may vary in concentration; however, usually the alkali metal hydroxide will constitute between about 1 weight percent and about 10 weight percent of the solution and preferably between about 2 and about 5 weight percent. Of the mineral acids which may be used to displace the alkali metal from the exchange resin, sulfuric acid is preferred; however, other mineral acids such as hydrochloric acid or nitric acid may be employed. Dilute concentrations of acid are desirable; usually the acid strength will be between about 1 weight percent and about 25 weight percent acid and preferably between about 3 and about 6 weight percent.

A variety of ion exchange resins may be used in the process of the invention. Strong base anion exchange resins are characterized as having fixed tertiary amine anion exchange sites which are positively charged at any pH. Weak base anion exchange resins have fixed primary or secondary amine anion exchange sites. The sites are positively charged depending on the pH of the solution. At higher pH the sites are neutral.

Type I resins are those which contain amine groups. Type II resins contain alkanolamine groups. Examples of strong base Type I anion exchange resins are styrene-divinylbenzene resins with quaternary ammonium groups attached to the polymer framework, such as Resintech TM SBG-1 and Sybron TM ASB-1, sold by Resintech Company. Strong base Type II anion exchange resins include styrene divinylbenzene resins with quaternary alkanolamine groups attached to the polymer framework, such as Resintech TM SBG-II and Sybron TM ASB-II, also available from Resintech Company.

Other resins which may be used include such materials as Bayer AG's Mobay TM M500, a Type I strong base anion exchange resin, which is a polystyrene resin with quaternary ammonium groups attached to the polymer framework; Rohm and Haas Amberlyst TM A-26, a Type I strong base anion exchange resin, which is a styrene-divinylbenzene copolymer with quaternary ammonium groups attached to the polymer framework and Rohm and Haas Amberline TM IRA-410, a Type II strong base amine-type anion exchange resin. Also included are Dow styrene-divinylbenzene strong base anion exchange resins having quaternary amines as their functional group. These materials are available under the DOWEX trademark.

Cation exchange resins which may be used include such materials as Rohm and Haas Amberline TM IRC-50, a weak acid cation exchange resin, which is a methacrylic acid divinylbenzene copolymer with carboxylic acid functional groups attached to the polymer framework; Rohm and Haas Amberlyst TM A-15, a strong acid cation exchange resin, which is a styrene-divinylbenzene copolymer resin with sulfonic acid groups attached to the polymer framework; and Rohm and Haas Amberlite TM IR-120, a strong acid cation exchange resin, which is a sulfonic styrene-divinylbenzene copolymer.

The preceding resins are merely illustrative of useful ion exchange resins and are not intended to limit the resins which may be used in carrying out the process of the invention.

The process of the invention has been described in conjunction with a batch operation where the flow of aqueous alkanolamine is halted while the ion exchange resins undergo regeneration. The process may also be carried out continuously by providing a plurality of resin exchangers, with appropriate piping and valves.

The use of dilute sodium hydroxide solutions for the preferential removal of alkanolamines from cation exchange resins in the process of the invention is desirable and is preferred for two reasons. One, dilute solutions are less expensive than more concentrated solutions. Second, if there is a break-through of alkali metal with the alkanolamine released from the resin, the contamination of the alkanolamine will be much less than if a concentrated alkali metal hydroxide solution is used. However, it is within the scope of the invention to use alkali metal hydroxide solutions of substantially higher concentrations than those preferred, up to as high as 15 weight percent alkali metal hydroxide or higher to obtain equally effective recovery of alkanolamine.

While certain embodiments and details have been shown for the purpose of illustrating the present invention, it will be apparent to those skilled in the art that various changes and modifications may be made herein without departing from the spirit or scope of the invention.

We claim:

1. A process for regenerating a cation exchange resin containing alkanolamine and alkali metal cations comprising:
   (a) continuously monitoring the effluent from said resin during the regeneration process by electronic means;
   (b) eluting said resin with an alkali metal hydroxide solution;
   (c) determining displacement of alkanolamine from said resin by a signal from said electronic means;
   (d) stopping flow of said alkali metal hydroxide upon elimination of alkanolamine from said resin as indicated by a signal from said electronic means;
   (e) eluting said resin with a mineral acid to displace the alkali metal cations and any remaining alkanolamine from the resin;
   (f) determining displacement of alkanolamine alkali metal cations from said resin by said electronic means;
   (g) stopping flow of said mineral acid upon elimination of alkali metal cations and alkanolamine from said resin as indicated by said electronic means.

2. The process of claim 1 in which said electronic means comprises a conductance probe and a trace recorder.

3. The process of claim 1 in which the alkali metal hydroxide solution is a solution of sodium hydroxide.

4. The process of claim 1 in which the alkanolamine cation is selected from the group consisting of protonated ethanolamine, diethanolamine, methyldiethanolamine, diisopropanolamine and triethanolamine.

5. The process of claim 1 in which the resin is water washed prior to and after steps (b) and (e).

6. The process of claim 1 in which the mineral acid is selected from the group of hydrochloric acid and sulfuric acid.

7. A process for removing hydrogen sulfide and carbon dioxide from hydrocarbon streams which additionally contain acid gases utilizing an aqueous alkanolamine solution in which,
   a) the alkanolamine reacts with the hydrogen sulfide and carbon dioxide to form alkanolamine salts and with the acid gases to form heat stable alkanolamine salts,
   b) said alkanolamine solution containing said salts is separated from said hydrocarbon stream,
   c) said alkanolamine salts of hydrogen sulfide and carbon dioxide are decomposed by heating said alkanolamine solution to recover hydrogen sulfide and carbon dioxide,
   d) said alkanolamine solution containing heat stable alkanolamine salts is contacted with an alkali metal hydroxide to convert said heat stable alkanolamine salts to alkali metal salts, e) said alkanolamine solution containing alkali metal salts, any unreacted alkanolamine salts and free alkanolamine is contacted with a cation exchange resin to remove alkali metal cations and alkanolamine cations resulting from (1) protonation of the free alkanolamine with hydrogen on the resin, and (2) the alkanolamine salts, the improvement comprising:

f) regenerating said cation exchange resin by eluting said resin with an alkali metal hydroxide solution, g) continuously monitoring the effluent from said resin during the regeneration process by electronic means, h) determining displacement of alkanolamine from said resin by a signal from said electronic means, i) stopping flow of said alkali metal hydroxide upon elimination of alkanolamine from said resin as indicated by said electronic means, j) eluting said resin with a mineral acid to displace the alkali metal cations and any remaining alkanolamine from the resin, k) determining displacement of alkanolamine alkali metal cations from said resin by a signal from said electronic means, l) stopping flow of said mineral acid upon elimination of alkali metal cations and alkanolamine from said resin as indicated by said electronic means.

8. The process of claim 7 in which said electronic means comprises a conductance probe and a trace recorder.

9. The process of claim 7 in which the resin is water washed after steps (f) and (j).

10. The process of claim 7 in which the alkanolamine cation is selected from the group consisting of protonated ethanolamine, diethanolamine, methyldiethanolamine, diisopropanolamine, and triethanolamine.

11. The process of claim 7 in which the alkali metal hydroxide is sodium hydroxide.

12. The process of claim 7 in which the mineral acid is selected from the group of hydrochloric acid and sulfuric acid.

13. A process for removing hydrogen sulfide and carbon dioxide from hydrocarbon streams which additionally contain acid gases utilizing an aqueous alkanolamine solution in which, a) the alkanolamine reacts with the hydrogen sulfide and carbon dioxide forming alkanolamine salts and with the acid gases forming heat stable alkanolamine salts, b) said alkanolamine solution containing said salts is separated from said hydrocarbon stream, c) said alkanolamine salts of hydrogen sulfide and carbon dioxide are decomposed by heating said alkanolamine solution to recover hydrogen sulfide and carbon dioxide, d) said alkanolamine solution containing heat stable alkanolamine salts is contacted with an alkali metal hydroxide to convert said heat stable alkanolamine salts to alkali metal salts, e) the alkanolamine solution containing alkali metal salts, any unreacted alkanolamine salts and free alkanolamine is contacted with an anion exchange resin to remove anions from the solution, f) the alkanolamine solution is then contacted with a cation exchange resin to remove alkali metal cations and alkanolamine cations resulting from (1) protonation of the free alkanolamine with hydrogen on the resin, and (2) the alkanolamine salts, the improvement comprising:

g) regenerating said cation exchange resin by eluting said resin with an alkali metal hydroxide solution, h) while continuously monitoring the effluent from said resin during the regeneration process by electronic means, i) determining displacement of alkanolamine from said resin by a signal from said electronic means, j) stopping flow of said alkali metal hydroxide upon elimination of alkanolamine from said resin as indicated by said electronic means, k) eluting said resin with a mineral acid to displace the alkali metal cations and any remaining alkanolamine from the resin, l) determining displacement of alkanolamine alkali metal cations from said resin by a signal from said electronic means, m) stopping flow of said mineral acid upon elimination of alkali metal cations and alkanolamine from said resin as indicated by said electronic means.

14. The process of claim 13 in which said electronic means comprises a conductance probe and a trace recorder.

15. The process of claim 13 in which said cation resin is water washed after steps (f), (j), and (m).

16. The process of claim 13 in which the alkanolamine cation is selected from the group consisting of cations of protonated ethanolamine, diethanolamine, methyldiethanolamine, diisopropanolamine and triethanolamine.

17. The process of claim 13 in which the alkali metal hydroxide is sodium hydroxide.

18. The process of claim 13 in which the mineral acid is selected from the group of hydrochloric acid and sulfuric acid.

19. A process for the regeneration of a cation exchange resin containing alkanolamine and alkali metal cations attached at the ionic sites on the resin, which comprises (a) eluting the resin with an alkali metal hydroxide solution whereby alkanolamine is selectively displaced from the resin, (b) measuring and recording the conductance of the effluent from the resin, (c) discontinuing elution with alkali metal hydroxide solution when the recorded conductance indicates displacement of the alkanolamine from the resin, (d) thereafter eluting the resin with a mineral acid to displace the alkali metal cations and any remaining alkanolamine from the resin, (e) discontinuing elution with mineral acid when the recorded conductance indicates the removal of alkali metal cations and any remaining alkanolamine from the resin.

* * * * *